(12) United States Patent
Pham et al.

(10) Patent No.: US 12,079,997 B2
(45) Date of Patent: Sep. 3, 2024

(54) METHOD FOR CORRECTING A CONTOUR

(71) Applicants: DENTAL MONITORING, Paris (FR); UNIVERSITE D'ORLEANS, Orleans (FR)

(72) Inventors: Van Trung Pham, Le Perreux sur Marne (FR); Yves Lucas, Saint Eloy de Gy (FR); Sylvie Treuillet, Sigloy (FR); Laurent Debraux, Paris (FR)

(73) Assignees: DENTAL MONITORING, Paris (FR); UNIVERSITE D'ORLEANS, Orleans (FR)

( * ) Notice: Subject to any disclaimer, the term of this patent is extended or adjusted under 35 U.S.C. 154(b) by 412 days.

(21) Appl. No.: 17/432,910

(22) PCT Filed: Feb. 21, 2020

(86) PCT No.: PCT/EP2020/054627
§ 371 (c)(1),
(2) Date: Aug. 21, 2021

(87) PCT Pub. No.: WO2020/169802
PCT Pub. Date: Aug. 27, 2020

(65) Prior Publication Data
US 2022/0207748 A1    Jun. 30, 2022

(30) Foreign Application Priority Data
Feb. 21, 2019    (FR) ...................................... 1901755

(51) Int. Cl.
*G06T 7/13*    (2017.01)
*G06T 5/70*    (2024.01)
*G06T 7/12*    (2017.01)

(52) U.S. Cl.
CPC .................. *G06T 7/13* (2017.01); *G06T 5/70* (2024.01); *G06T 7/12* (2017.01); *G06T 2207/20084* (2013.01); *G06T 2207/30036* (2013.01)

(58) Field of Classification Search
CPC .... G06T 7/10; G06T 7/12; G06T 7/13; G06T 7/181; G06T 7/187; G06T 2207/20081;
(Continued)

(56) References Cited

U.S. PATENT DOCUMENTS

| 2016/0275674 A1 | 9/2016 | Rivet-Sabourin et al. |
| 2018/0189935 A1* | 7/2018 | McHugh .................. G06T 5/20 |
| 2019/0180443 A1* | 6/2019 | Xue .......................... G06T 7/13 |

FOREIGN PATENT DOCUMENTS

| JP | 2013078395 A | 5/2013 |
| TW | 201034633 A | 10/2010 |

OTHER PUBLICATIONS

International Search Report corresponding to International Application No. PCT/EP2020/054627 dated Apr. 23, 2020, 7 pages.
(Continued)

*Primary Examiner* — Geoffrey E Summers
(74) *Attorney, Agent, or Firm* — Ronald M. Kachmarik; Cooper Legal Group LLC (57) ABSTRACT

A method for determining a contour of the representation, on a photo of an object made up of one or several elements, referred to as an "actual contour." The method includes the following steps: 1) application of a first treatment to the photo so as to obtain a first image representing a first contour of the object; 2) application of a second treatment to the photo so as to obtain a second image representing a second contour of the object; 3) association, according to a predetermined association algorithm, of each point of the second contour with a point of the first respective contour, then removal of the points of the first contour that have not been
(Continued)

associated with a point of the second contour, the first image then representing a corrected contour of the object.

21 Claims, 7 Drawing Sheets

(58) Field of Classification Search
CPC . G06T 2207/20084; G06T 2207/30036; G06T 2207/20116; G06T 2207/20152; G06T 2207/20161; G06T 5/005; G06N 3/02–0985; G06V 10/26–273; G06V 30/148–158
See application file for complete search history.

(56) References Cited

OTHER PUBLICATIONS

Joonhyang Choi, et al., "Boosting Proximal Dental Caries Detection via Combination of Variational Methods and Convolutional Neural Network", Journal of Signal Processing Systems, Springer, US, vol. 90, No. 1, Dec. 6, 2016, pp. 87-97.

* cited by examiner

[Fig 1]

1) application of a first processing to the photo so as to obtain a first image showing a first contour of an object shown on the photo

2) application of a second processing to the photo so as to obtain a second image showing a second contour of said object

3) association, with each point of the second contour, of a respective point of the first contour, then elimination of the unassociated points of the first contour 4) preferably, refinement of the contour by addition, for each pair of two points of the corrected contour isolated from each other and separated by a Euclidian distance less than a predefined threshold, of a line between said two isolated points

METHOD FOR CORRECTING A CONTOUR

TECHNICAL FIELD

The present invention relates to the field of the analysis of photos, and notably of photos of dental arches. It relates in particular to a method for improving the quality of a contour shown on an image obtained by analysis of a photo.

PRIOR ART

The processing of a photo by computer in order to determine the contour of the representation of an object on this photo, or "actual contour", is well known. In particular, it is conventional to detect the regions of high contrast of the photo.

The methods for detecting contours allow a first image to be obtained essentially showing a first contour corresponding, with a good precision, to the actual contour. However, the first image comprises defects. In particular, the first image shows points which, in reality, do not correspond to the actual contour. Parts of the actual contour may furthermore not be shown on the first image.

The first image may be manually corrected. The manual corrections are however long and sometimes uncertain.

There accordingly exists a need for a method allowing a first image to be corrected automatically, in other words without intervention of an operator. Such a method is particularly sought for analyzing photos of dental arches in order to define the contour of the teeth.

One aim of the invention is to meet this need.

DESCRIPTION OF THE INVENTION

Summary of the Invention

The invention provides a method for determining, by computer, a contour of the representation, on a photo, of an object composed of one or more elements, referred to as "actual contour", said method comprising the following steps:
1) application of a first processing to the photo in such a manner as to obtain a first image showing a first contour of said object;
2) application of a second processing to the photo in such a manner as to obtain a second image showing a second contour of said object;
3) association, according to a predetermined association algorithm and for each point of the second contour, of a respective point of the first contour, then elimination of the points of the first contour not having been associated with a point of the second contour, the first image then showing a corrected contour of said object;
4) preferably, refinement of the corrected contour by addition, for each pair of two points of the corrected contour isolated from one another and separated by a Euclidian distance less than a predefined threshold, of a line between said two isolated points of the corrected contour.

As will be seen in more detail in the following part of the description, a method according to the invention allows at least one part of the defects of the first image to be eliminated. It transforms the first image into a corrected image showing a corrected contour substantially identical to the actual contour. Thus, each point of the first contour which is not associated with a point of the second contour is eliminated, the other points of the first contour being conserved in order to form the corrected contour. In contrast to a method of the prior art, a method according to the invention does not lead to determining a new contour which would be deduced from the first and second contours, but is a method for correcting the first contour. This correction only consists in a potential elimination of points from the first contour.

A method according to the invention may furthermore comprise one or more of the following optional and preferred features:
- the photo shows a dental arch and/or said object is a set of teeth and/or said elements are teeth;
- said object comprises all or a part of a tooth and/or of a dental appliance and/or of a dental brace and/or of a dental veneer and/or of a dental arch and/or of a retractor and/or of a soft tissue of the oral environment, for example of a gum and/or of a lip and/or of a mucous membrane of a cheek and/or of the tongue;
- the first processing is a processing for contour detection, preferably a processing by means of a neural network, preferably an analysis by a deep learning neural network, preferably by Richer Convolutional Features (RCF);
- the second processing comprises the following steps:
    A. segmentation of the photo, preferably by means of a neural network, preferably by means of a deep learning neural network, preferably by Mask R-CNN, in such a manner as to obtain a segmented image showing, for each "element", an elementary mask as a superposition in registry on the representation of said element on the photo when the photo and the segmented image are superposed in registry;
    B. comparison of the segmented image and of the photo in such a manner as to obtain a probability map, each point of the probability map having a value of probability defined as a function of the probability that the point of the corresponding segmented image represents a point of the representation of the element on the photo;
    C. determination of the second contour using the probability map;
- at the step B., the probability map is a quadmap, in other words a probability map in which each point has a "probability value" chosen from amongst four predetermined values SF, SB, PF and PB;
- the probability map is generated according to the following steps:
    B1. assignment of the temporary value SFp to any point of an initial map corresponding to a point of said at least one elementary mask;
    B2. filtering of the photo according to color in such a manner as to obtain a filtered image, then binarization of the filtered image, the threshold for the binarization being determined based on all the points of the filtered image, in such a manner as to obtain a first binarized image composed of first and second regions B2, potentially fragmented, the first region B2 being the region which contains the majority of the points corresponding to said at least one elementary mask, then assignment of the temporary value PBp to any point of the initial map corresponding to a point of said first region B2 and assignment of the temporary value SBp to any point of the initial map corresponding to a point of said second region B2;
    B3. binarization of the filtered image, the threshold for the binarization being determined using only points of the filtered image which correspond to points of the first region B2 (in other words points having the temporary value PBp) of the first binarized image, in such a manner as to obtain a second binarized image composed of first and second regions B3, potentially fragmented, the first region B3 being the region which contains the majority of the points corresponding to said at least one elementary mask, and assignment of the temporary value PFp ("PF provisional") to any point of the initial map corresponding to a point of said first region B3;

B4. processing of each point of the initial map resulting from the preceding steps, by application of the following rule:
if the point is assigned the temporary value SFp, the probability value SF is assigned to it;
otherwise, if the point is assigned PFp, the probability value PF is assigned to it;
otherwise, if the point is assigned PBp, the probability value PB is assigned to it;
otherwise, the probability value SB is assigned to it;
in such a manner as to obtain the probability map;

said filtering of the photo is configured as a function of the colors of the points of the photo;
said filtering of the photo consists in selecting the channel "a*" in the chromatic space L*a*b*;
the binarizations of the filtered image at the step B2. and/or at the step B3. comprise the application of an Otsu filter;
the step C. comprises the following steps:
C1. binarization of the probability map in such a manner as to obtain a framing image composed of first and second probability regions, the first region substantially covering said at least one elementary mask when the framing image is superposed onto the segmented image, the limit of the first region being called "frame";
C2. preferably, post-processing of the framing image;
C3. after superposition in registry of the framing image and of the segmented image, expansion of the elementary masks, simultaneously, at the same speed and uniformly, until a continuation of the expansion no longer leads to an additional filling of the frame, the expansion of an elementary mask being locally stopped when the expanded elementary contour which bounds it comes into contact with another elementary mask;
C4. union of the set of expanded elementary contours in order to define the second contour;
the binarization of the probability map is obtained by application of a GrabCut algorithm to said probability map;
the GrabCut algorithm is chosen so as to binarize the probability map as a function of a distance map, preferably unsigned, in which each point is assigned a value of distance determined as a function of, preferably proportional to, the distance between the corresponding point on the photo and the first contour;
the framing image is smoothed, preferably by an Alpha-Matting and/or Gaussian Blur algorithm and/or by application of an Otsu filter;
at the step 3), the association algorithm is configured for associating with a point of the second contour the point or points of the first contour which are the closest to said point of the second contour;
at the step 4), preferably, the line between the two points is determined by means of the filter A*.

Advantageously, the method according to the invention leads to a corrected contour, preferably refined, substantially identical to the actual contour. Advantageously, the corrected contour, preferably refined, may be composed of a set of elementary contours, each elementary contour bounding a respective element of the object. In other words, the invention not only allows the quality of the first contour of the object to be improved, it also allows this first contour to be divided up into elementary contours.

An "object" may be composed of one or more "elements". For example, on a photo showing a dental arch, the object "dentition" is composed of the set of elements "tooth".

The invention also relates to:
a computer program comprising program code instructions for the execution of a method according to the invention when said program is executed by a computer,
a data medium on which such a program is recorded, for example a memory or a CD-ROM.

Definitions

An "image" is a representation in two dimensions composed of pixels, or "points". A "photo" is therefore a particular image, conventionally in color, preferably realistic, taken with a camera. A "map" relating to a photo is also a particular image. Each point of a map exhibits information relating to the corresponding point of the photo, onto which it is superposed when the map is superposed in registry with the photo. The information may, in particular, be a probability that the point of the photo represents an object or a particular element.

The phrases "image of an arch", "photo of an arch", "representation of an arch", etc. are understood to mean an image, a photo, a representation, etc. of all or part of said dental arch.

A "retractor" is a device which comprises an upper edge and a lower edge extending around a retractor opening. In the operational position, the upper and lower lips of the patient are pressing against the upper and lower edges, respectively. The retractor is configured in such a manner as to elastically push apart the upper and lower lips in such a manner as to render the teeth visible through the opening. A retractor thus allows the teeth to be observed without them being obstructed by the lips. The teeth do not however rest on the retractor, such that the patient is able, by turning their head with respect to the retractor, to modify the teeth which are visible through the opening of the retractor. It is also able to modify the opening between the arches. Preferably, the retractor comprises ears for spreading the cheeks, which allows the vestibular faces of the teeth at the back of the mouth, such as the molars, to be observed.

A "neural network" or "artificial neural network" is a set of algorithms well known to those skilled in the art.

The neural network may in particular be chosen from amongst:
networks specialized in the classification of images, known as "CNN" ("Convolutional neural network")
R-CNN (2013)
SSD (Single Shot MultiBox Detector: Object Detection network),
Faster R-CNN (Faster Region-based Convolutional Network method: Object Detection network)
networks specialized in segmentation, for example:
Deep Mask (Learning To Refine Object Segments)
Mask-RCNN MaskLab (Instance Segmentation by Refining Object Detection with Semantic and Direction Features)

Fully Convolutional Instance-aware Semantic Segmentation networks specialized in contour detection, for example:

RCF (Richer Convolutional Features for Edge Detection) (2017)

HED (Holistically-Nested Edge Detection).

The list hereinabove is non-limiting.

In order to be operational, a neural network must be driven by a learning process called "deep learning", using a learning database composed of a set of recordings each comprising an image and a description of the image. By presenting the recordings at the input of the neural network, the latter learns progressively how to generate a description for an image presented to it. Conventionally, the learning database must comprise more than 10,000 recordings.

The Otsu filter is a well-known binarization algorithm, in which the filtering threshold is determined by analysis of the image to be binarized (like at the step B2.), or of a part of the image to be binarized (like at the step B3.), then is used for filtering each point of this image.

A GrabCut algorithm is a conventional algorithm which is based on a graph cut method by min-flow/max-cut.

A method according to the invention makes use of various images. Some operations, for example comparisons, make use of several of these images. Even where it is not explicitly stated, it should be considered that these images are superposed in registry, in other words in such a manner that the points of these images which relate to the same element shown on the photo are superposed. Two points (or two surfaces) belonging to two superposed images in registry and which are superposed on one another "correspond" to one another or are said to be "in correspondence".

A "contour" is a line or a set of lines which bound an object and preferably the elements constituting this object. For example, the contour of a dentition could be a line which defines the external limits of this dentition. Preferably, it furthermore comprises the lines which define the limits between adjacent teeth. Preferably, the contour of the dentition is therefore composed of the set of contours of the teeth which constitute this dentition.

A contour shown on an image may be complete, and hence closed on itself, or incomplete. Two points of a contour are said to be "isolated" when they are not connected to one another by this contour.

The "segmentation" of an image is a conventional operation by which regions of the image meeting a criterion or resulting from a processing operation ("segments") are defined. For example, the photo of an arch may be segmented in order to define regions of this image which represent teeth. The segments are independent entities in that they may for example be selected individually.

The "binarization" of an image is an operation by which a value chosen from between two predetermined values is assigned to each point of the image. As opposed to a segmentation, the binarization does not create independent segments.

The terms "comprising" or "exhibiting" or "having" should be interpreted in a non-restrictive manner, unless otherwise indicated.

BRIEF DESCRIPTION OF THE DRAWINGS

Other features and advantages of the invention will become more clearly apparent upon reading the detailed description that follows and upon examining the appended drawings in which.

DETAILED DESCRIPTION

Figure 1:
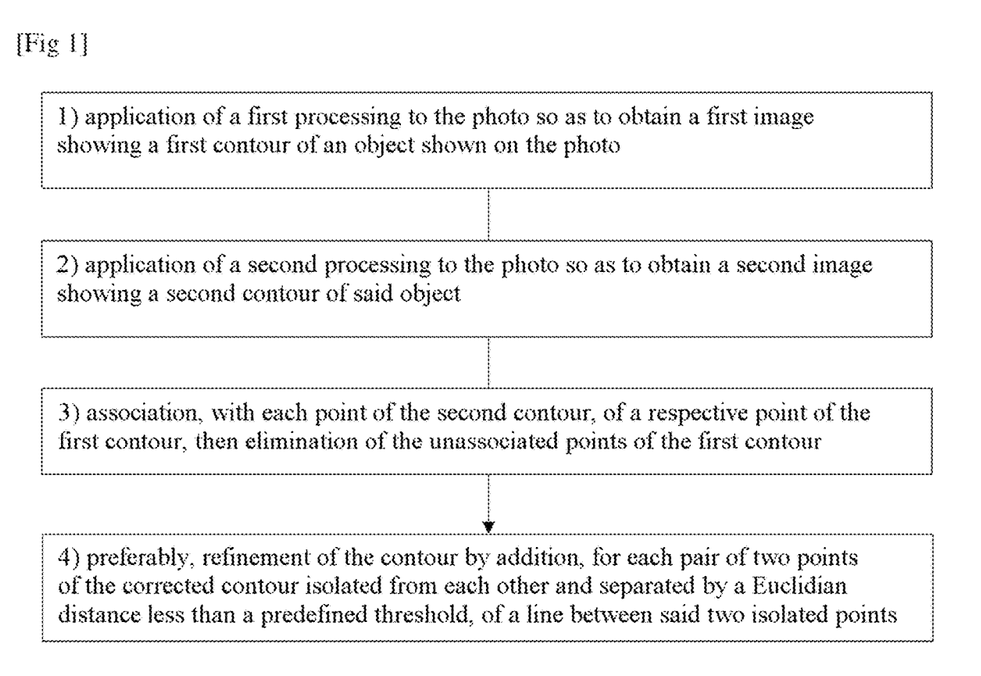
FIG. 1 shows schematically the various steps of a method according to the invention.

As illustrated in FIG. 1, a method according to the invention comprises the steps 1) to 3), and preferably a step 4).

The detailed description that follows relates to one embodiment of this method in which a photo 2 shows a dental arch. The invention is indeed particularly useful in this application, notably for determining the contour of the dentition 4, but also the contours of each of the teeth in the photo 2. The invention is not however limited by this embodiment. In particular, the invention may also be useful for determining the contour of a dental appliance, and/or of a dental brace and/or of a dental veneer and/or of a dental arch, and/or of a soft tissue present in the mouth of the patient, for example of a lip and/or of a gum and/or of a mucous membrane of the cheeks and/or of the tongue.

The photo 2 is preferably an extra-oral view, for example a photo taken facing the patient, preferably a photo taken with a retractor. More preferably, the photo is a representation of a real object as perceived by the human eye, as opposed to a tomograph or to a panorama acquired by X-rays.

The dentition is, in the embodiment in question, the actual contour of the object "dentition" shown on the photo.

Figure 2:
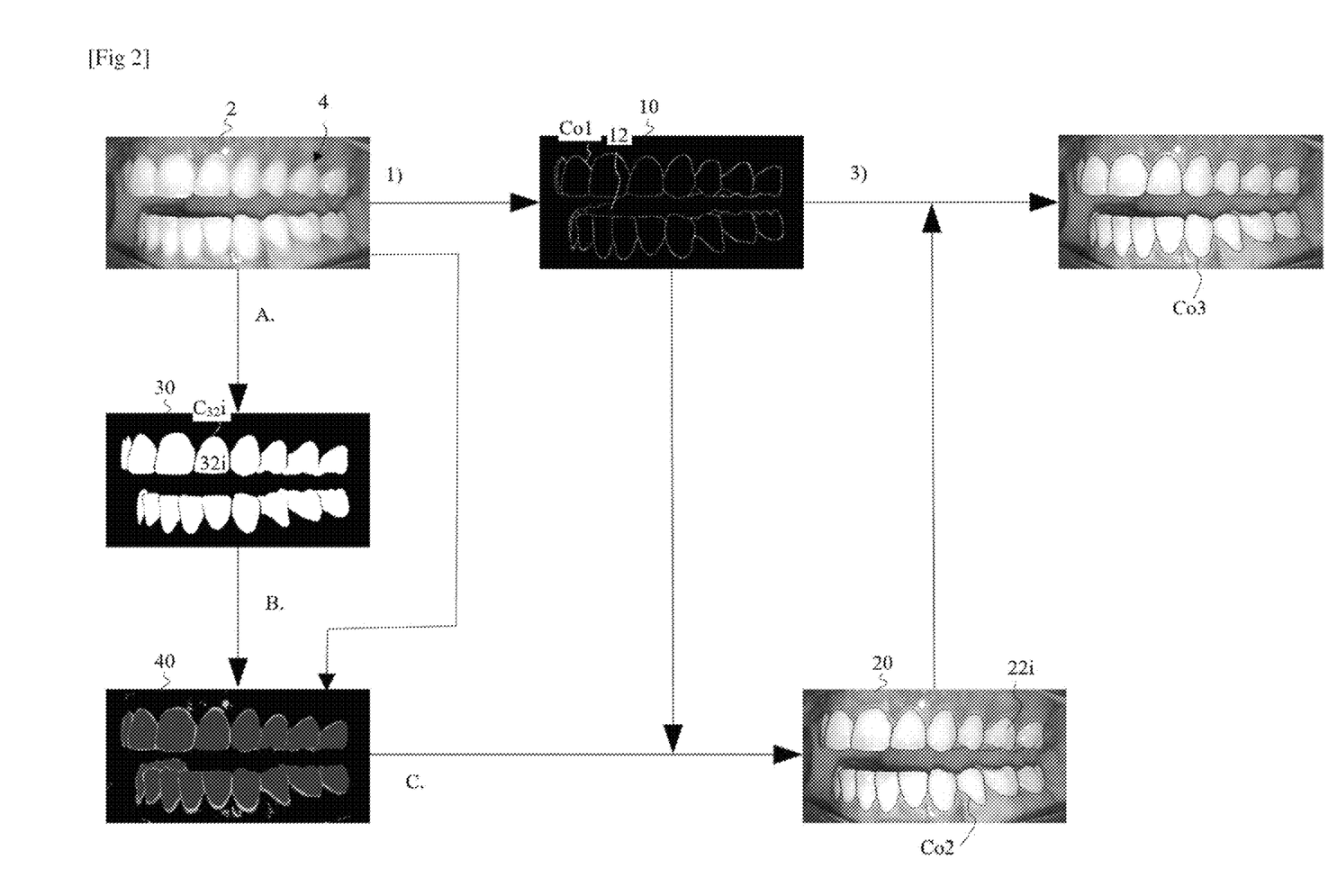
FIG. 2 shows graphically the various steps of a method according to the invention.

At the step 1), a first processing is applied to a photo 2 in such a manner as to obtain a first image 10 showing a first contour Co1 of the dentition. The first contour Co1 shown on the first image 10 allows an observer to distinguish the various teeth. Generally speaking, the first processing does not however allow the computer to identify the various teeth. In other words, for the computer, the first contour Co1 is that of the object "dentition" rather than a set of contours for each element "tooth".

The first contour Co1 is accurate, but the first image comprises defects. In particular, the first image shows points 12 which, in reality, do not correspond to the dentition contour.

The first processing is preferably a contour detection processing.

The detection processing may notably implement one or more of the following known and preferred methods:

application of a Canny filter, notably in order to search for contours using the Canny algorithm;

application of a Sobel filter, notably for calculating derivatives by means of the Sobel extended operator;

application of a Laplace filter, for calculating the Laplacian of an image;

spot detection on an image ("BlobDetector");
application of a threshold ("Threshold") for applying a fixed threshold to each element of a vector;
re-dimensioning, using relationships between the pixel regions ("Resize(Area)") or bi-cubic interpolations on the environment of the pixels;
erosion of the image by means of a specific structuring element;
expansion of the image by means of a specific structuring element;
retouch, in particular using regions in the neighborhood of the restored region;
application of a bilateral filter;
application of a Gaussian Blur;
application of an Otsu filter, in order to look for the threshold which minimizes the intra-class variance;
application of a filter A*, in order to look for a path between points;
application of an adaptive threshold ("AdaptiveThreshold") in order to apply an adaptive threshold to a vector;
application of a filter for equalizing a histogram of an image in gray tones in particular;
blur detection ("BlurDetection"), in order to calculate the entropy of an image using its Laplacian;
contour detections ("FindContour") for a binary image;
color filling ("FloodFill"), notably in order to fill in an element connected with a given color.

The detection processing may also implement one or more of the following known non-limiting methods, although they are not preferred:
application of a "MeanShift" filter, in such a manner as to find an object on a projection of the image;
application of a "CLAHE" (for "Contrast Limited Adaptive Histogram Equalization") filter;
application of a "Kmeans" filter, for determining the center of clusters and of groups of samples around clusters;
application of a DFT filter, in such a manner as to perform a discrete Fourier transform, direct or inverse, of a vector;
calculation of moments;
application of a "HuMoments" filter for calculating Hu invariants;
calculation of the integral of an image;
application of a Scharr filter, allowing a derivative of the image to be calculated by implementing a Scharr operator;
search for the convex envelope of points ("ConvexHull");
search for points of convexity of a contour ("ConvexityDefects");
comparison of shapes ("MatchShapes");
verification whether points are in a contour ("PointPolygonTest");
detection of Harris contours ("CornerHarris");
search for the minimum eigen values of matrices of gradients, in order to detect the corners ("CornerMinEigenVal");
application of a Hough transform in order to find circles in a gray-scale image ("HoughCircles");
"Active contour modeling" (tracing of the contour of an object based on a 2D—potentially "noisy"—image);
calculation of a force field, called GVF ("gradient vector flow"), within a part of the image;
cascade classification ("CascadeClassification");
processing by a deep learning neural network.

It is, in particular, possible to use the following preferred detection processing techniques:
Canny, described in "J Canny. A computational approach to edge detection. *IEEE Trans. Pattern Anal. Mach. Intell.*, 8(6): 679-698, June 1986";
Global Probability of Boundary (GPB), described in "P. Arbelaez, M. Maire, C. Fowlkes, and J. Malik. Contour detection and hierarchical image segmentation. *IEEE Transactions on Pattern Analysis and Machine Intelligence*, 33(5): 898-916, May 2011".

The contour detection processing may implement artificial intelligence, and in particular be carried out by "machine learning".

The processing by machine learning may notably be chosen from amongst:
Sketch Tokens (ST), described in "Joseph J. Lim, C. Lawrence Zitnick, and Piotr Dollar. Sketch tokens: A learned mid-level representation for contour and object detection. In *Proceedings of the 2013 IEEE Conference on Computer Vision and Pattern Recognition*, CVPR '13, pages 3158-3165, Washington, DC, USA, 2013, IEEE Computer Society", and
Structured Edge (SE), described in "Piotr Dollar and C. Lawrence Zitnick. Fast edge detection using structured forests. *CoRR*, abs/1406.5549, 2014".

From amongst all, the preferred contour detection processing is a processing by means of a neural network, preferably an analysis by a deep learning neural network, chosen from within the list given in the chapter on definitions hereinabove, preferably chosen from amongst:
Holistically-Nested Edge Detection (HED), described in "Saining "Xie and Zhuowen" Tu. Holistically-nested edge detection. In *Proceedings of IEEE International Conference on Computer Vision*, 2015" and
"Richer convolutional features for edge detection" (RCF) CoRR, abs/1612.02103, 2016, by Yun Liu, Ming-Ming Cheng, Xiaowei Hu, Kai Wang, and Xiang Bai,
preferably by Richer Convolutional Features (RCF).

The learning database for the neural network may conventionally be constituted manually, by tracing and by identifying all the external and visible contours of teeth shown on historical photos. Each recording of the learning database then comprises a historical photo and a description of this photo identifying these contours on the historical photo.

Optionally, the first image 10 may be processed by non-maxima suppression (NMS), preferably as described in "J Canny. A computational approach to edge detection. *IEEE Trans. Pattern Anal. Mach. Intell.*, 8(6): 679-698, June 1986", so as to obtain a gray-scale image, then by binarization, for example by application of a threshold, or, preferably, as described in N. Otsu, A threshold selection method from gray level histograms. *IEEE Trans. Systems, Man and Cybernetics*, 9: 62-66, March 1979. The first contour is however still too thick and there remains noise.

At the step 2), a second processing is applied to the photo in such a manner as to obtain a second image 20 showing a second contour Co2 of the dentition.

The second processing preferably comprises a segmentation of the photo 2 in such a manner as to identify the elementary tooth region 22*i*, in other words in such a manner as to identify, for each representation of a tooth on the photo 2 ("element"), a respective region which extends up to the limits of this representation.

Preferably, the steps A. to C. are carried out.

At the step A., the segmentation is preferably implemented by means of a neural network, preferably a deep learning neural network chosen from within the list given in the chapter on definitions, preferably chosen from amongst Deep Mask (Learning To Refine Object Segments)

Mask-RCNN

MaskLab (Instance Segmentation by Refining Object Detection with Semantic and Direction Features)

Fully Convolutional Instance-aware Semantic Segmentation

Preferably, the neural network is chosen from amongst the networks capable of separating elements side by side, such as the teeth. Advantageously, the contours at the interfaces between the teeth may thus be detected.

Preferably, the neural network is the network Mask R-CNN.

Such a neural network is notably described in "Mask R-CNN. CoRR", abs/1703.06870, 2017, by Kaiming He, Georgia Gkioxari, Piotr Doll'ar, and Ross B. Girshick.

The learning database may be conventionally constituted manually, by tracing and by identifying all the representations of the teeth shown on historical photos, identical to or different from those used for driving the neural network implemented at the step 1) for the contour detection. Each recording of the learning database then comprises a historical photo and a description of this photo identifying each of the regions of the historical photo (or "mask") covering the representation of a tooth.

In one embodiment, the segmentation is implemented according to the following steps:
i. establishment of a three-dimensional model modeling at least one dental arch shown on the photo, and dividing up this arch model so as to define, for each tooth, a three-dimensional tooth model;
ii. search for a view allowing the arch model to be observed, such as the photo, and definition of the tooth regions on said view based on tooth models (the limit of each tooth region being that of the representation, on the view, of the corresponding tooth model);
iii. definition of the masks with said tooth regions.

Optimization algorithms, preferably metaheuristic methods, preferably for simulated annealing, may be used at the step ii.

In one embodiment, the arch model is modified at the step ii., preferably by displacement or deformation of the tooth models, until a view exhibiting a maximum concordance with the photo is obtained.

PCT/EP2015/074896 provides useful details for carrying out such a segmentation.

The segmentation results in a segmented image 30 representing an elementary mask $32i$ for each of the "i" teeth shown on the photo. Each elementary mask $32i$ is bounded by a respective elementary contour $C_{32}i$. The segmentation also leads to an individual identification, by the computer, of each elementary mask $32i$ and/or of each elementary contour $C_{32}i$, in the segmented image.

Figure 3:
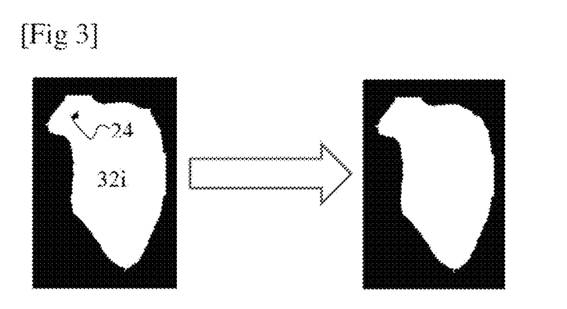
FIG. 3 illustrates a post-processing of an elementary mask.

The elementary masks $32i$ are preferably post-processed, in a conventional manner, so as to eliminate the "holes" 24, as illustrated in FIG. 3.

Figure 8:
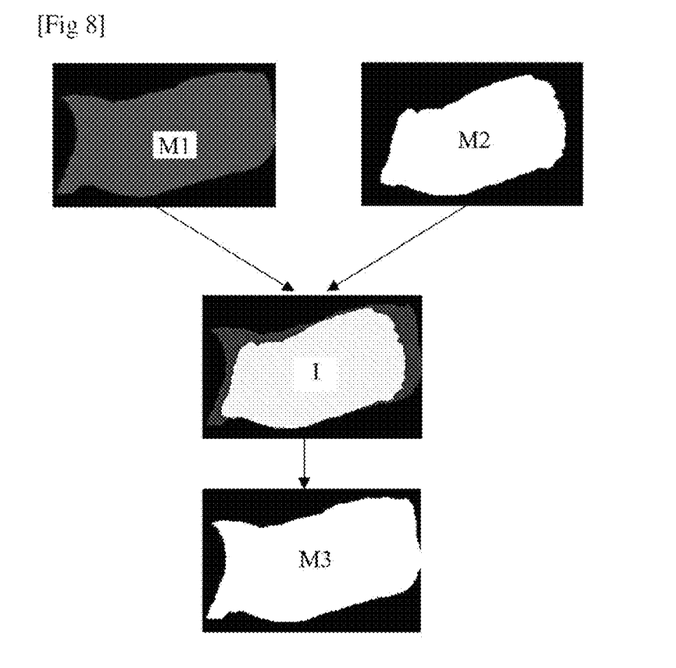
FIG. 8 illustrates graphically a first exemplary processing for the intersections between elementary masks.
Figure 9:
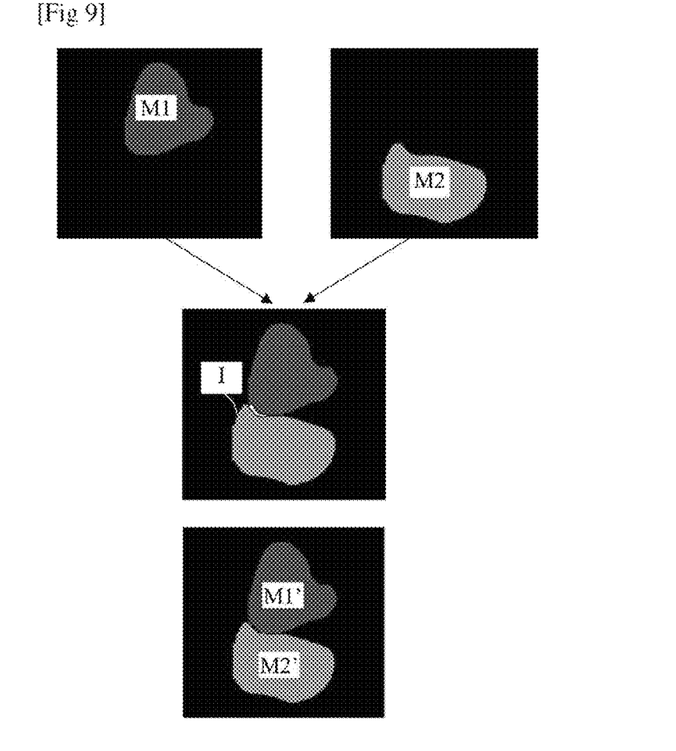
FIG. 9 illustrates graphically a second exemplary processing for the intersections between elementary masks.

Preferably, an overlap between first and second elementary masks is processed in the following manner
determination of the area A0 of the intersection region I, of the area A1 of the first elementary mask M1, of the area A2 of the second elementary mask M2, and calculation of the ratios A0/A1 and A0/A2;
if at least one of said ratios is greater than a first predefined threshold, for example of 0.8, merging of the first and second masks in order to obtain a single mask (FIG. 8);
if the two said ratios are less than a second predefined threshold, for example of 0.1, elimination of the intersection region I of each of the first and second elementary masks, which leads to first and second modified elementary masks M1' and M2' (FIG. 9).

Generally, the elementary contours $C_{32}i$ are however not very precise.

At the step B., the segmented image 30 and the photo 2 are compared in order to obtain a probability map 40.

In the probability map, each point of the probability map has a value, referred to as "probability value". The probability value of a point of the probability map 40 depends on the probability that the corresponding point of the segmented image 30 (in other words the point of the segmented image which is superposed onto said point of the probability map when the probability map and the segmented image are superposed in registry) represents a point of the representation of a tooth on the photo.

Preferably, in the probability map 40, each point has a probability value chosen from amongst a set of three or four predetermined values, preferably four predetermined values. Such a probability map is conventionally called "quadmap".

The four predetermined values are denoted by SF, SB, PF and PB, for "Sure-Foreground", "Sure-Background", "Probable-Foreground" and "Probable-Background", respectively.

The probability value may for example be defined in the following manner

The probability value "Sure-Foreground" is assigned to a point of the probability map 40 when it is considered that the probability that the corresponding point of the segmented image 30 represents a point of a said element of the photo is 100%.

The probability value "Sure-Background" is assigned to a point of the probability map 40 when it is considered that the probability that the corresponding point of the segmented image 30 does not represent a point of a said element of the photo is 100%.

The probability value "Probable-Foreground" is assigned to a point of the probability map 40 when it is considered that the probability that the corresponding point of the segmented image 30 represents a point of a said element of the photo is less than 100% but is probable, for example greater than a threshold, for example of 50%.

The probability value "Probable-Background" is assigned to a point of the probability map 40 by default, in other words when it is neither "Sure-Foreground", nor "Sure-Background", nor "Probable-Foreground".

Figure 4:
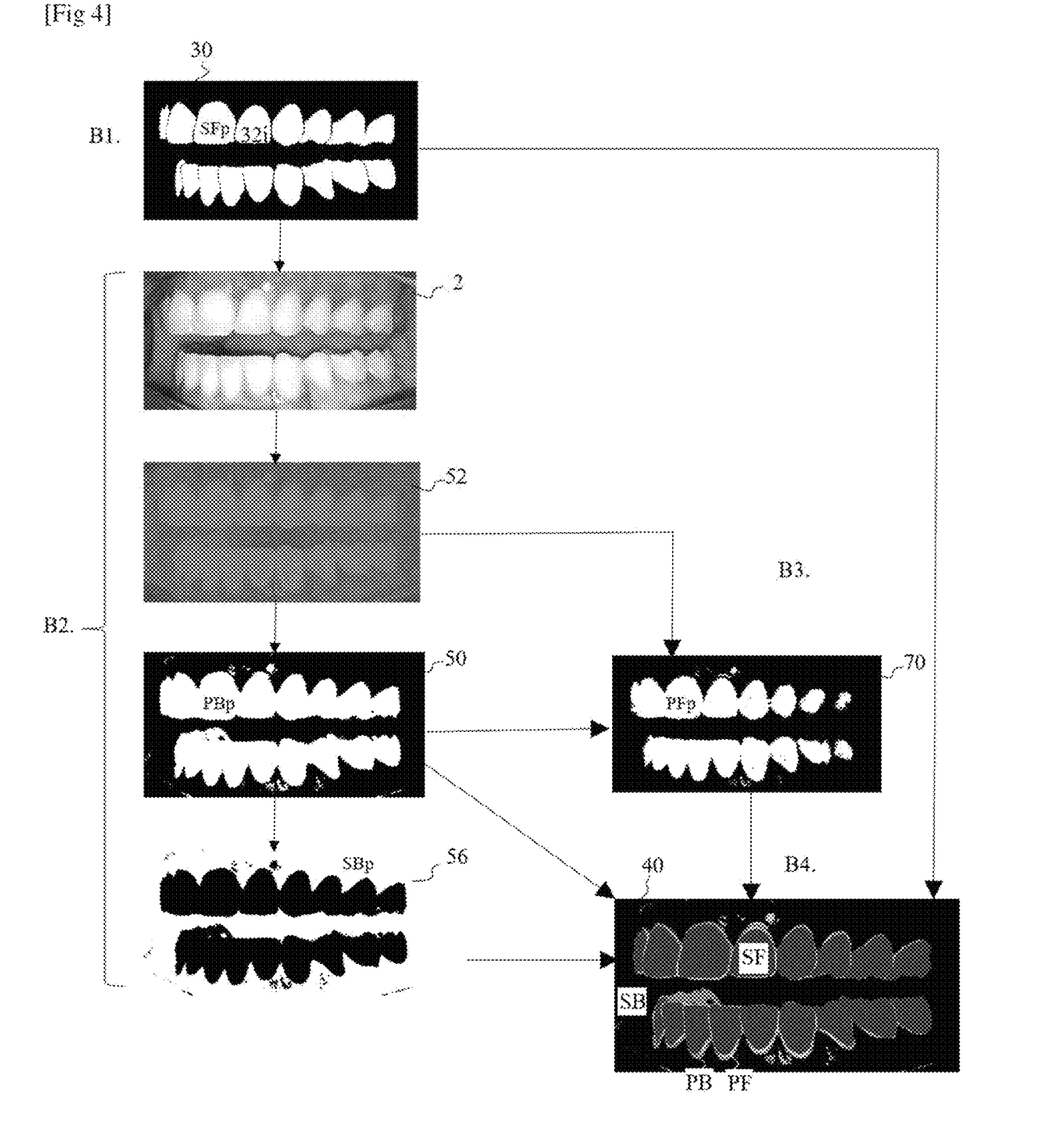
FIG. 4 shows graphically the various steps of a step B. of a method according to the invention.

The formation of the quadmap may be carried out by computer, preferably according to the steps B1. to B4., illustrated in FIG. 4. The steps B1. and B2. may be carried out in any given order.

Initially, none of the points of the probability map has a probability value. The probability map is referred to as "initial map".

At the step B1., a temporary value SFp ("SF provisional") is assigned to any point of the initial map which corresponds to a point of an elementary mask $32i$, in other words which, according to the segmentation effected at the step A., should be superposed with the representation of a tooth on the photo. In other words, in a first analysis, it is considered that the step A. has allowed the photo to be perfectly segmented and that the elementary masks correspond perfectly to the representations of the teeth on the photo.

At the step B2., the photo 2 is filtered as a function of the color in such a manner as to obtain a filtered image 52, then the filtered image 52 is binarized in such a manner as to obtain a first binarized image 50. The threshold for the binarization is determined based on all the points of the filtered image 52.

The first binarized image 50 may for example be represented in black and white, without gray scale. Both the first "white" region and the second "black" region may be in one or more pieces. In the first binarized image 50 in FIG. 4, the first region is thus composed of two pieces each representing the dentition of an arch.

The objective of the step B2. is to end up with the first "white" region representing the teeth of the dental arches and the second "black" region representing the background.

Generally speaking, the parameters for the filtering of the photo must be chosen according to the color of the elements in such a manner that the first region is superposed on these elements while precisely masking them. In particular, the color of the teeth is relatively uniform and very different from that of the gums and of the cheeks. It is therefore advantageous to filter the photo 2 to take advantage of this difference in color.

Each point has a color which can be defined in the chromatic space L*a*b* CIE 1976, generally referred to as CIELAB. The filtering of the photo preferably consists, for each point, in cancelling the values L* and b*, in other words in selecting the channel "a*", then in inverting the values of a*, which leads to the filtered image 52.

For the binarization, an Otsu filter is preferably applied to the filtered image 52, as described in "N. Otsu. A threshold selection method from gray level histograms. *IEEE Trans. Systems, Man and Cybernetics*, 9: 62-66, March 1979", which leads to the first binarized image 50. The threshold used for the Otsu filter is determined over all the points of the filtered image 52.

The temporary value PBp ("PB provisional") is then assigned to any point of the initial map corresponding to a point of said first region B2 ("white" region). The first "white" region is generally wider than the set of elementary masks of the segmented image 30.

The temporary value SBp ("SB provisional") is furthermore assigned to any point of the initial map corresponding to a point of said second region B2 ("black" region). (In practice, the first binarized image 50 is inverted so as to obtain a first inverted binarized image 56 making the second region B2 appear "in white".)

In other words, as a first analysis, it is considered that the binarization has allowed, on the first binarized image 50, a second "black" region to be created which extends exclusively over everything that does not represent a tooth (gums, cheeks, etc.), and that the first "white" region covers the representations of the teeth on the photo and "probably" a bit of background. The temporary value PBp cannot therefore be rendered definitive for all the points to which it is assigned. The following steps allow the situation to be improved.

At the step B3., the filtered image 52 is binarized, preferably using the same method of binarization as that used at the step B2., the threshold for the binarization being however determined using only the points of the filtered image 52 which correspond to the first "white" region (PBp) of the first binarized image 50. Preferably, an Otsu filter with such a threshold is used.

The binarization of the step B3. leads to a second binarized image 70 composed of first and second regions B3, that, for the sake of clarity, are referred to as "light" and "dark", respectively. It is considered that the first "light" region is that which extends mainly over the representations of the teeth. The temporary value PFp ("PF provisional") is assigned to the points composing it.

At the step B4., each point of the initial map is processed such that a single probability value is assigned to it, depending on the temporary values that have been assigned to it at the preceding steps. The following rule is preferably applied to each point:
  if the point is assigned the temporary value SFp, the probability value SF is assigned to it;
  otherwise, if the point is assigned PFp, the probability value PF is assigned to it;
  otherwise, if the point is assigned PBp, the probability value PB is assigned to it;
  otherwise, the probability value SB is assigned to it;
in such a manner as to obtain the probability map 40.

At the step C., the second contour is determined from the probability map 40.

The method preferably continues according to the steps C1. to C5.

Figure 5:
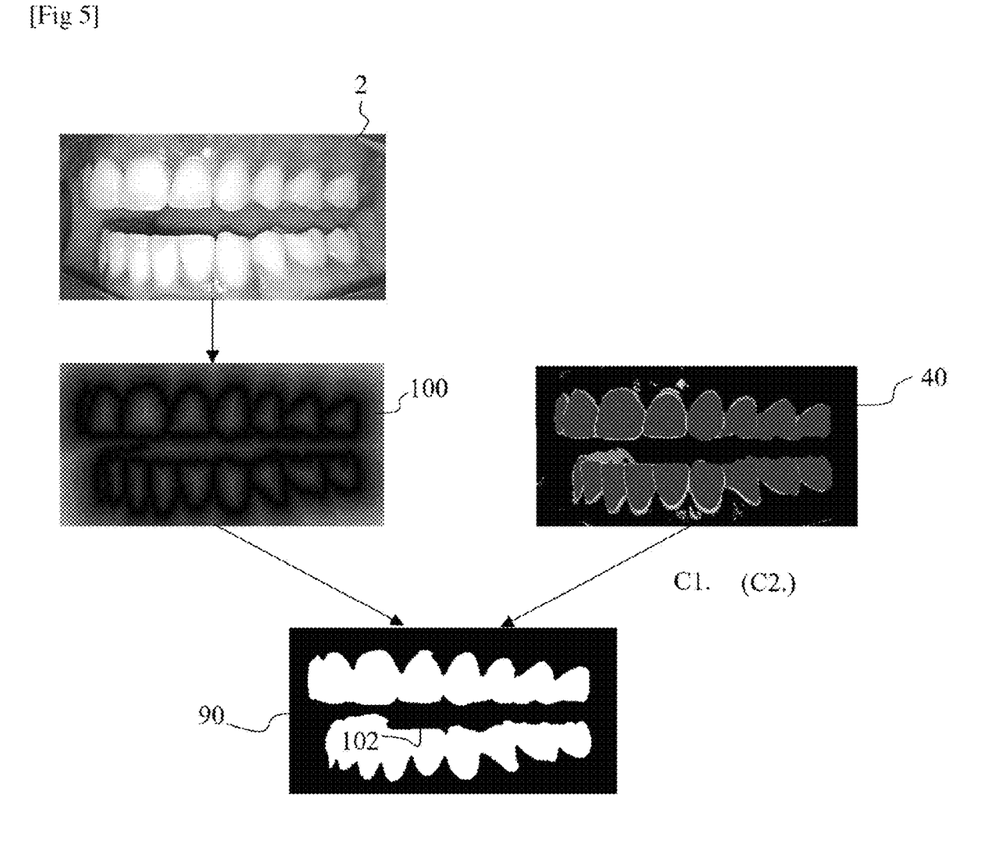
FIG. 5 shows graphically the various steps of a step B. of a method according to the invention.

At the step C1. (FIG. 5), the probability map 40 is binarized, preferably by means of a GrabCut.

A framing image 90 is thus obtained composed of first and second probability regions, the elementary masks being included in the first region (white in FIG. 5) when the framing image 90 is superposed in registry onto the segmented image 30.

The limit of the first region is called "frame" 102 and is used to limit the expansion at the following step C3.

Preferably, the algorithm described in "Holistically-nested edge detection" is used by using at the input the probability map 40 and a distance map 100, preferably unsigned, in which each point is assigned a distance value determined as a function of, preferably proportional to, preferably equal to the Euclidian distance between the corresponding point on the photo and the first contour Co1 shown on the first image 10.

The documents
  "GrabCut": Interactive foreground extraction using iterated graph cuts. ACM Trans. Graph., 23(3): 309-314, August 2004" by Carsten Rother, Vladimir Kolmogorov and Andrew Blake, and
  "Interactive Graph cut for optimal boundary and region segmentation of objects in N-D images, by Yuri Y. Boykov Marie-Pierre Jolly 2001
describe the principle of a GrabCut, well known to those skilled in the art.

The total energy E of the GrabCut algorithm is preferably:

$$E = \alpha \cdot \Sigma R_p(A_p) + \beta \cdot \Sigma B(p,q) + \lambda \cdot \varphi((p+q)/2),$$

p and q being the positions of the two points being considered,
  $R_p(A_p)$, $B(p,q)$ and $\varphi((p+q)/2)$ being, respectively, the energies of the region being considered (region of the object to be detected or region of the rest of the image), of the border between the region of the object to be detected and the region of the rest of the image, and said unsigned distance value of the point in the middle of the points p and q;
  α, β, λ being parameters which govern the contribution of each component in the total energy.

At the step C2., the framing image 90 is preferably smoothed, preferably by an alpha-matting algorithm and/or Gaussian Blur algorithm and/or by application of an Otsu filter.

Alpha-matting algorithms are in particular described in

"Shared sampling for real-time alpha matting", Computer Graphics Forum, 29(2): 575-584, May 2010. Proceedings of Eurographics, by Eduardo S. L. Gastal and Manuel M. Oliveira, "Poisson matting. ACM Trans. Graph.", 23(3): 315-321, August 2004, by Jian Sun, Jiaya Jia, Chi-Keung Tang, and Heung-Yeung Shum, "A Bayesian approach to digital matting", in Proceedings of the 2001 IEEE Computer Society Conference on Computer Vision and Pattern Recognition. CVPR 2001, volume 2, pages II-264-II-271 vol. 2, 2001, by Yung-Yu Chuang, B. Curless, D. H. Salesin, and R. Szeliski, or in "A global sampling method for alpha matting", in Proceedings of the 2011 IEEE Conference on Computer Vision and Pattern Recognition, CVPR '11, pages 2049-2056, Washington, DC, USA, 2011. IEEE Computer Society, by Kaiming He, C. Rhemann, C. Rother, Xiaoou Tang, and Jian Sun.

Preferably, the algorithm described in "Shared sampling for real-time alpha matting" is used.

Figure 6:
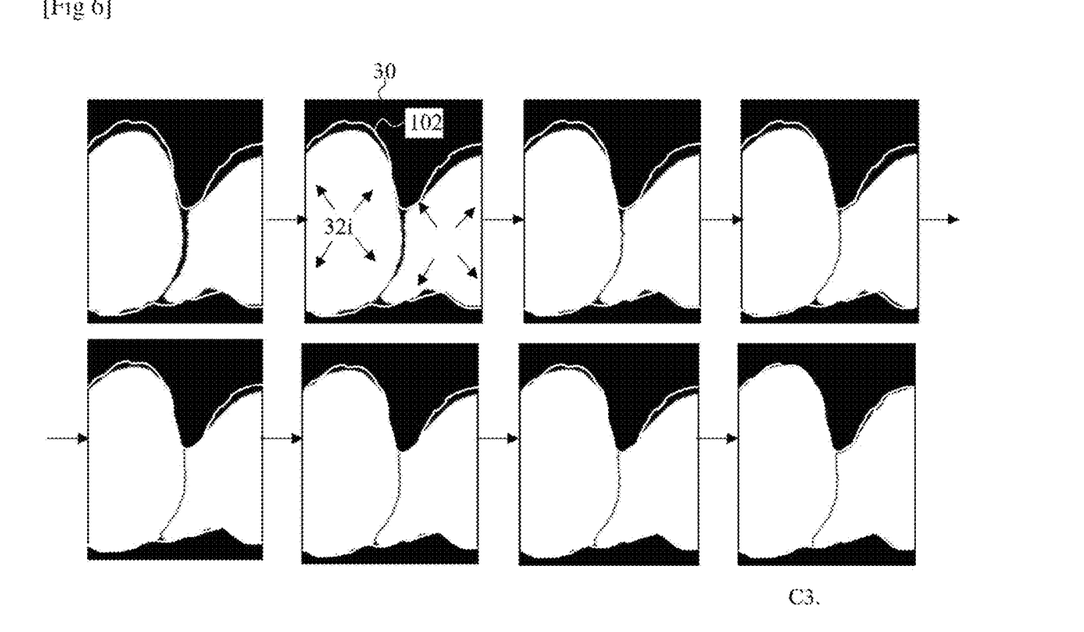
FIG. 6 illustrates graphically the effect of a step C3. of a method according to the invention.

At the step C3., illustrated in FIG. 6, the frame 102 is transferred into the segmented image 30, in registry, then the elementary masks of the segmented image are expanded.

All the elementary masks are expanded simultaneously, at the same speed and uniformly with the constraint that the elementary masks cannot overlap.

The expansion of an elementary mask 32$i$ is therefore locally interrupted when it comes into contact with another elementary mask. In other words, it is locally halted at the place where the elementary mask 32$i$ has come into contact with another elementary mask.

When the continuation of the expansion no longer leads to any additional filling of the frame, the expansion is stopped. The portions of the elementary masks which extend outside of the frame are then removed.

At the step C4., when the expansion has finished, the second contour Co2 is defined by the set of elementary contours of the elementary masks. In FIG. 2, the second image 20 showing the second contour has been superposed onto the photo 2.

Figure 7:
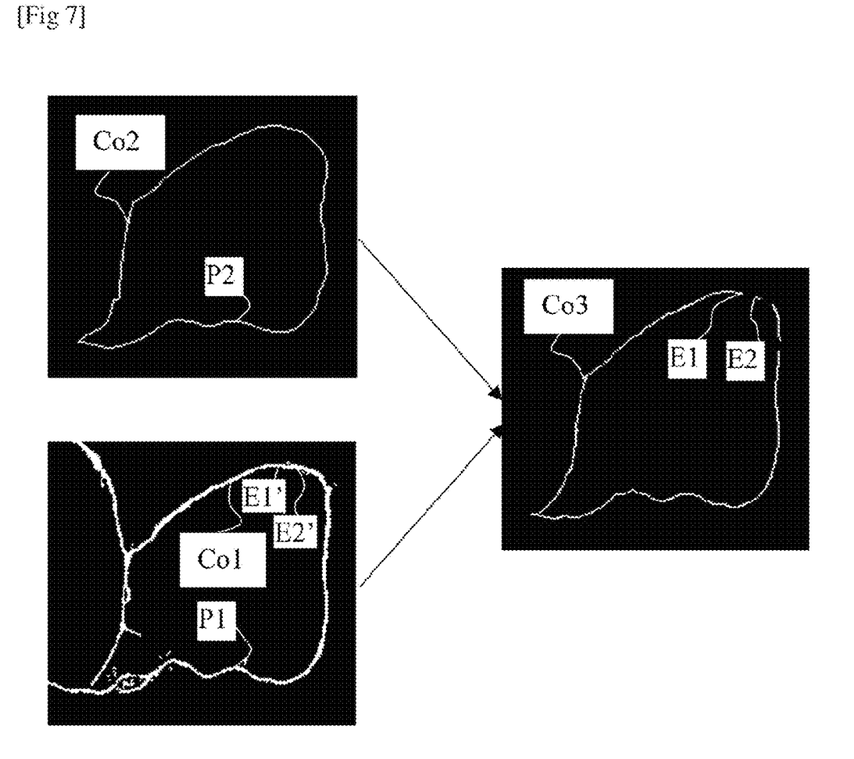
FIG. 7 shows graphically a step 3) of a method according to the invention.

At the step 3), illustrated in FIG. 7, a respective point of the first contour is associated according to a predetermined association algorithm and for each point of the second contour.

Preferably, the association algorithm successively considers each point P2 of the second contour Co2. For a point P2, it successively considers each point P1 of the first contour Co1 and evaluates the Euclidian distance between P2 and P1. It then stores the point P1 that is the nearest to the point P2.

When all the points of Co2 have been processed, the points of the first contour Co1 that have not been associated with a point of the second contour Co2 are eliminated, which results in a corrected contour Co3. The tests performed show that the points of the corrected contour correspond, with a high precision, to the actual contour of the photo 2.

Fractions of the actual contour may however not be shown on the corrected contour.

At the step 4), the corrected contour is therefore preferably refined by addition, for each pair of two points of the corrected contour isolated from each other and separated by a Euclidian distance less than a predefined threshold, of a line between said two isolated points of the corrected contour.

Preferably, the line between the two points is determined by means of the filter A*. This filter, well known, is described in "A formal basis for the heuristic determination of minimum cost paths" IEEE Transactions on Systems Science and Cybernetics, 4(2): 100-107, July 1968, by P. E. Hart, N. J. Nilsson, and B. Raphael.

In one preferred embodiment, each end point E1 at one end of a continuous fraction of the corrected contour is successively considered.

For each point E1, the end point or points E2 are sought which are at a minimum Euclidian distance from E1 and are not connected to E1. If a point E2 is found, corresponding points E1' and E2' are sought on the first contour Co1.

If the corresponding points E1' and E2' are connected together on the first contour Co1, with the algorithm A*, a path that connects them is determined, then this path is added to the corrected contour Co3.

Alternatively, rather than looking for corresponding points E1' and E2', it is possible to create a path, preferably with the algorithm A*, between the points E1 and E2 if they comply with a criterion, for example if the Euclidian distance separating them is less than a threshold.

As can now be seen, based on a photo, the invention allows a contour of high precision to be determined. Furthermore, this contour is advantageously segmented into a plurality of elementary contours which can be selected independently of one another.

It goes without saying that the invention is not limited to the embodiments described and shown, which are provided solely for illustrative purposes.

The invention claimed is:

1. A method for determining, by computer, a contour, referred to as "actual contour", of the representation, on a photo, of an object composed of one or more elements, said method comprising the following steps:

1) application of a first processing to the photo in such a manner as to obtain a first image showing a first contour of said object;

2) application of a second processing to the photo in such a manner as to obtain a second image showing a second contour of said object;

3) association, according to a predetermined association algorithm and for each point of the second contour, of a respective point of the first contour, then elimination of the points of the first contour not having been associated with a point of the second contour, the first image then showing a corrected contour of said object, said corrected contour following the actual contour, in which the first processing is a contour detection processing, and the second processing comprises the following steps:

A. segmentation of the photo, in such a manner as to obtain a segmented image showing, for each "element", an elementary mask superposed in registry onto the representation of said element on the photo when the photo and the segmented image are superposed in registry;

B. comparison of the segmented image and of the photo in such a manner as to obtain a probability map, each point of the probability map having a probability value defined as a function of the probability that the point of the corresponding segmented image represents a point of the representation of the element on the photo;

C. determination of the second contour using the probability map, said step C. comprising the following steps:

C1. binarization of the probability map in such a manner as to obtain a framing image composed of first and second probability regions, the first region substantially covering said at least one elementary mask when the framing image is superposed onto the segmented image, the limit of the first region being referred to as "frame";

C3. after superposition in registry of the framing image and of the segmented image, expansion of the elementary masks, simultaneously, at the same speed and uniformly, until continuing the expansion no longer leads to an additional filling of the frame, the expansion of an elementary mask being locally stopped when the expanded elementary contour which bounds it comes into contact with another elementary mask;

C4. union of the set of expanded elementary contours for defining the second contour.

2. The method as claimed in claim 1, in which the photo shows a dental arch, said object is a set of teeth and said elements are teeth.

3. The method as claimed in claim 1, in which the contour detection processing is a processing by means of a neural network, and the segmentation of the photo is implemented by means of a neural network.

4. The method as claimed in claim 3, wherein the contour detection processing is a processing by Richer Convolutional Features.

5. The method as claimed in claim 3, wherein the segmentation of the photo is implemented by Mask R-CNN.

6. The method as claimed in claim 1, in which at the step B. each point of the probability map has a "probability value" chosen from amongst four predetermined values, denoted as SF, SB, PF and PB, respectively.

7. The method as claimed in claim 6, in which the probability map is generated according to the following steps:

B1. assignment of a first predetermined temporary value at any point of an initial map corresponding to a point of said at least one elementary mask;

B2. filtering of the photo as a function of the color in such a manner as to obtain a filtered image, then binarization of the filtered image, the threshold for the binarization being determined using all the points of the filtered image, in such a manner as to obtain a first binarized image composed of first and second regions B2, the first region B2 being the region which contains the majority of the points corresponding to said at least one elementary mask, then assignment of a second predetermined temporary value to any point of the initial map corresponding to a point of said first region B2 and assignment of a third predetermined temporary value to any point of the initial map corresponding to a point of said second region B2;

B3. binarization of the filtered image, the threshold for the binarization being determined using only the points of the filtered image which correspond to points of the first region B2 of the first binarized image, in such a manner as to obtain a second binarized image composed of first and second regions B3, the first region B3 being the region which contains the majority of the points corresponding to said at least one elementary mask, and assignment of a fourth predetermined temporary value to any point of the initial map corresponding to a point of said first region B3;

B4. processing of each point of the initial map modified following the steps B1. to B3., by application of the following rule:

if the point is assigned the first temporary value, the probability value SF is assigned to it; otherwise, if the point is assigned the fourth predetermined temporary value, the probability value PF is assigned to it; otherwise, if the point is assigned the second predetermined temporary value, the probability value PB is assigned to it; otherwise the probability value SB is assigned to it.

8. The method as claimed in claim 7, in which said filtering of the photo at the step B2. consists in selecting the channel "a*" in the chromatic space L*a*b*.

9. The method as claimed in claim 7, in which the binarizations of the filtered image at the step B2., or at the step B3., or at the steps B2. and B3., comprise the application of an Otsu filter.

10. The method as claimed in claim 1, in which, at the step C1., a GrabCut algorithm is applied to said probability map.

11. The method as claimed in claim 10, in which the GrabCut algorithm is chosen for binarizing the probability map as a function of a distance map, in which each point is assigned a value of distance determined as a function of the distance between the corresponding point on the photo and the first contour.

12. The method as claimed in claim 11, wherein the distance map is unsigned.

13. The method as claimed in claim 10, in which, at the step C2., the framing image is smoothed.

14. The method as claimed in claim 13, wherein the framing image is smoothed by an alpha-matting and/or Gaussian Blur algorithm.

15. The method as claimed in claim 13, comprising, after step 3), the following step: 4) refinement of the corrected contour by addition, for each pair of two points of the corrected contour isolated from one another and separated by a Euclidian distance less than a predefined threshold, of a line between said two isolated points of the corrected contour.

16. The method as claimed in claim 15, in which, at the step 4), the line between the two points is determined by means of a filter A*.

17. The method as claimed in claim 1, in which at the step 3), the association algorithm is configured for associating with a point of the second contour the point or points of the first contour which are the closest to said point of the second contour.

18. The method as claimed in claim 1, wherein, at step A., the photo is segmented by means of a deep learning neural network.

19. The method as claimed in claim 1, wherein, at step A., the photo is segmented by Mask R-CNN.

20. The method as claimed in claim 1, said method comprising, between steps C1. and C3., the following step:

C2. post-processing of the framing image.

21. The method as claimed in claim 1, wherein said object is a set of teeth and/or said elements are teeth, or said object comprises all or a part of a tooth and/or of a dental appliance and/or of a dental brace and/or of a dental veneer and/or of a dental arch and/or of a retractor and/or of a soft tissue of the oral environment.

* * * * *